Patented Apr. 22, 1947

2,419,224

UNITED STATES PATENT OFFICE 2,419,224

SEALING COMPOSITION

Paul W. Millelot, Jr., Maywood, Ill., assignor to American Can Company, New York, N. Y., a corporation of New Jersey No Drawing. Application December 10, 1943, Serial No. 513,719

6 Claims. (Cl. 106—172)

My invention relates generally to sealing or packing compositions and comprises more particularly a novel and economical sealing composition or gasket material for use in the lining of the sealing flanges of sanitary sheet metal containers.

Containers of this type are used largely in the packaging of various food products, such as vegetables, fruits, meats, dry powders, etc., and such containers must be hermetically sealed to retain a substantial vacuum produced by processing of the contents or by direct vacuumization, thereby effectively preserving the product packed in such containers for comparatively long periods of time.

Natural rubber, when properly treated, processed or compounded has certain desirable properties that make it an efficient and hermetic sealing medium for food containers. These desirable properties include resilience, elasticity, plastic flow under heat and pressure, adhesion to metal, tack and resistance to corrosion and aging. Natural rubber or its latex was probably the most widely used material in sealing compounds for the hermetic sealing of sheet metal containers before war conditions rendered it a scarce and critical material.

In the search for a suitable substitute, and after extensive experimentation with various materials, I discovered a sealing compound, containing no natural rubber, which has proved itself at once economical and highly efficient as a gasket lining material for container joints, especially for the sealing of the interlocked flanges of sheet metal container bodies and ends, commonly called double seams.

The principal object of my invention or discovery is the provision of a sealing composition which, although containing no natural rubber, has substantially all the desirable characteristics, properties and advantages of sealing compounds in which natural rubber plays a leading part, such as resilience, elasticity, plasticity, adhesion and tack, resistance to corrosion by food acids, alkalies, salts, etc., and resistance to age deterioration and in addition is comparatively economical and comparatively easy to prepare and to apply.

Numerous other objects and advantages of my invention will be apparent as it is better understood from the following detailed description which is a preferred embodiment of my invention.

The sealing compound of my invention comprises ethyl cellulose as the chief and essential film-forming ingredient in combination with a compatible plasticizer, a tacky resin extender, an inert, inexpensive and finely divided filler and if desired an opacity producing pigment and also if desired a color imparting pigment and an organic solvent or solvents and/or diluents which are nontoxic, have a comparatively low boiling range and are compatible with the solid ingredients.

I discovered that Hercules T100 ethyl cellulose gave the best results. Other grades of Hercules ethyl cellulose, with slight changes in formulation and solvent also gave satisfactory results. I also found that castor oil (A. A. grade) is a very satisfactory and comparatively inexpensive plasticizer for the ethyl cellulose. Other non-drying plasticizers such as soybean oil (preferably combined with a lesser amount of soybean fatty acid), "Hercoyln" (hydrogenated methyl abietate) and dibutyl phthalate may be used as suitable substitutes.

In order to obtain enhanced tackiness or adhesiveness of the compound I found the addition of a resin extender such as Hercules "Staybelite" not only compatible with ethyl cellulose but substantially essential.

While not essential, I found that for the sake of economy, a small percentage (not over 20%) of finely divided inert filler or fillers did not adversely affect the desired properties of the sealing compound. I found "Catalpo," a hydrous aluminum silicate, a product of Moore & Munger, very satisfactory as a filler in my sealing composition. However, "Multifex," a precipitated calcium carbonate made by the Diamond Alkali Company, "Celite" (diatomaceous earth), zinc oxide and other similar, finely divided fillers may be used. "Multifex" seems to be partially affected by fruit acids and is not recommended for acidic products.

When it is desired to impart opacity to the compound a small percentage of titanium dioxide or similar opaque pigment may be admixed.

For certain purposes it may also be desirable to color the compound, in which case a trace or modicum of color pigment, such as carbon black, may be added.

When the sealing compound of the present invention is to be used to seal the joints or seams of food containers it is essential that only sanitary and non-toxic ingredients and solvents and/or diluents be used. Also because modern high speed container manufacture requires speedy drying of compound lined container parts it is desirable to employ low boiling solvents and/or diluents. Also such solvents and diluents must effectively and compatibly dissolve or disperse the solid ingredients used. I found that ethyl acetate and petroleum naphtha (n-hexane or n-heptane or a mixture thereof) are best suited as solvents and/or diluents of the solid ingredients of my sealing compound.

My experiments have demonstrated that in order to obtain the sealing compound of my invention, certain fairly definite ranges of proportion of ingredients should be observed. I have found that satisfactory results are obtained within the following ranges:

| | Percent |
|---|---|
| Ethyl cellulose | About 30-40 |
| Plasticizer | do 15-30 |
| Resin extender | do 15-30 |
| Filler and pigments | do 10-20 |

The following four formulae have thus far given the best results:

*Formula No. 1*

| | Percent |
|---|---|
| Hercules T100 ethyl cellulose | 36.36 |
| A. A. castor oil | 27.27 |
| Hercules "Staybelite" resin | 18.18 |
| "Catalpo" | 18.19 |

*Formula No. 2*

| | Percent |
|---|---|
| Hercules T100 ethyl cellulose | 36.36 |
| A. A. castor oil | 18.18 |
| Hercules "Staybelite" resin | 27.27 |
| "Catalpo" | 18.19 |

*Formula No. 3*

| | Percent |
|---|---|
| Hercules T100 ethyl cellulose | 36.36 |
| Soybean oil | 14.54 |
| Soybean fatty acids | 3.64 |
| Hercules "Staybelite" resin | 27.27 |
| "Catalpo" | 14.55 |
| Titanium dioxide | 3.64 |
| Carbon black | Trace |

*Formula No. 4*

| | Percent |
|---|---|
| Hercules T100 ethyl cellulose | 40 |
| A. A. castor oil | 20 |
| Hercules "Staybelite" resin | 30 |
| "Catalpo" | 8 |
| Titanium dioxide | 2 |
| Carbon black | Modicum |

The percentages of the four formulae are percentages by weight of the solid ingredients in the dried compound film.

In all four examples the compound is made up to about 23 percent total solids in a mixture of 85 percent n-hexane and 15 percent ethyl acetate. For efficient solvent action on this grade of ethyl cellulose the proportion of ethyl acetate should not be under 10 percent.

N-100 grade of Hercules ethyl cellulose would be a suitable substitute for the T-100 grade given in the examples, in which case, however, a higher ratio of ethyl acetate (solvent) to n-hexane (diluent) in the solvent mixture is recommended. The "T" grade of Hercules Ethyl Cellulose has an ethoxyl content of 48.5 to 50 percent and the "N" grade an ethoxyl content of 46.8 to 48.5 percent.

In preparing my novel, non-rubber sealing compound for the lining of container joints, I have found either of the following two methods to be satisfactory:

I call the first method the dry or milling method. By this method the solid ingredients (including the plasticizer) are worked together into a fairly homogeneous mass on a rubber mill. The ethyl cellulose is first sheeted out by means of cool, tight rolls together with a small initial quantity of plasticizer to prevent the stock being worked from becoming too brittle. Then the plasticizer (castor oil, soybean oil, etc.) and the "Staybelite" resin are worked into the mass until a smooth sheet is formed. When desired or needed, fillers and pigments are incorporated into the stock last. This mixture requires but one milling since the sole purpose of the milling is to disperse the filler and pigment particles uniformly among the particles of ethyl cellulose, the plasticizer and resin. The compound stock is next cut up into small pieces, dissolved in a suitable mixture of petroleum naphtha (boiling range: 140-160 degrees F.) and ethyl acetate and mixed into a smooth solution. The liquid compound is then brought to lining viscosity by adding additional solvents (if necessary) and strained, and is then ready for the lining or coating operation.

The second method of preparing the sealing compound of my invention I have called the wet or solvent method. It is accomplished without the use of a rubber mill and is, therefore, less expensive. It consists in first dissolving the ethyl cellulose (in granular or powder form) in a mixture of suitable solvents and plasticizer in a vessel or tank preferably with the aid of a power mixer, followed by the addition of the "Staybelite" resin (preferably ground or pulverized), fillers and pigments (if desired), preferably in the order named. When complete solution and homogeneous dispersion have been attained, the liquid compound is brought to lining viscosity and strained and is now ready to be used in the sealing compound applying machine.

This second method is satisfactory when the particle size of the fillers and pigments is sufficiently fine and the degree of wettability of the fillers and pigments by the solvents is sufficiently high to yield a fine dispersion.

The sealing compound prepared in accordance with the foregoing specifications is in liquid form and of such viscosity that it can be flowed or otherwise deposited onto the flanges of container parts by any conventional sealing compound lining machine. The lined container parts, such as sheet metal can ends, are then subjected to the usual and well known drying procedure.

While I have described my invention as primarily adapted to the sealing of sheet metal container joints, I do not wish to limit myself to this particular use, for it has or may have much wider application.

It is thought that the invention and many of its attendant advantages will be understood from the foregoing description, and it will be apparent that various changes may be made in the use of ingredients and their proportions and in the steps of the process described and their order of accomplishment without departing from the spirit and scope of the invention or sacrificing all of its material advantages, the novel composition and process hereinbefore described being merely a preferred embodiment thereof.

I claim:

1. A sealing composition for the lining of the joints of food containers and for similar purposes, which comprises in combination, a homogeneous mixture of ethyl cellulose in proportions of substantially 30 to 40 percent, a vegetable oil of the class consisting of castor oil and soy bean oil as a plasticizer in proportions of substantially 15 to 30 percent, a hydrogenated rosin as a resin extender in proportions of substantially 15 to 30 percent and a finely divided inert filler of not over 20 percent, said proportions being percentages by weight of said solid ingredients, said ingredients being dissolved and dispersed to proper lining viscosity by a non-toxic low boiling solvent.

2. A sealing composition for the lining of the joints of food containers and for similar purposes, which comprises in combination, a homogeneous mixture of ethyl cellulose in proportions of substantially 30 to 40 percent, a vegetable oil of the class consisting of castor oil and soy bean oil as a plasticizer in proportions of substantially 15 to 30 percent, a hydrogenated rosin as a resin extender in proportions of substantially 15 to 30 percent and a finely divided inert filler of not ever 20 percent, said proportions being percentages by weight of said solid ingredients, said ingredients being dissolved and dispersed to proper lining voscosity by a solvent mixture consisting of ethyl acetate and petroleum naphtha.

3. A sealing composition for the lining of the joints of food containers and for similar purposes, which comprises in combination the following solid ingredients in percentages by weight:

| | Per cent |
|---|---|
| Hercules T100 ethyl cellulose | 36.36 |
| A. A. castor oil | 27.27 |
| Hercules "Staybelite" resin | 18.18 |
| "Catalpo" | 18.19 | dissolved and dispersed to proper lining viscosity by a non-toxic low boiling solvent.

4. A sealing composition for the lining of the joints of food containers and for similar purposes, which comprises in combination the following solid ingredients in percentages by weight:

| | Per cent |
|---|---|
| Hercules T100 ethyl cellulose | 36.36 |
| A. A. castor oil | 18.18 |
| Hercules "Staybelite" resin | 27.27 |
| "Catalpo" | 18.19 | dissolved and dispersed to proper lining viscosity by a non-toxic low boiling solvent.

5. A sealing composition for the lining of the joints of food containers and for similar purposes, which comprises in combination the following solid ingredients in percentages by weight:

| | Per cent |
|---|---|
| Hercules T100 ethyl cellulose | 36.36 |
| Soybean oil | 14.54 |
| Soybean fatty acids | 3.64 |
| Hercules "Staybelite" resin | 27.27 |
| "Catalpo" | 14.55 |
| Titanium dioxide | 3.64 |
| Carbon black | Trace | dissolved and dispersed to proper lining viscosity by a non-toxic low boiling solvent.

6. A sealing composition for the lining of the joints of food containers and for similar purposes, which comprises in combination the following solid ingredients in percentages by weight:

| | Per cent |
|---|---|
| Hercules T100 ethyl cellulose | 40 |
| A. A. castor oil | 20 |
| Hercules "Staybelite" resin | 30 |
| "Catalpo" | 8 |
| Titanium dioxide | 2 |
| Carbon black | Modicum | dissolved and dispersed to proper lining viscosity by a non-toxic low boiling solvent.

PAUL W. MILLELOT, Jr.

REFERENCES CITED

The following references are of record in the file of this patent:

UNITED STATES PATENTS

| Number | Name | Date |
|---|---|---|
| 2,327,862 | Borglin | Aug. 24, 1943 |
| 2,325,966 | O'Leary | Aug. 17, 1943 |
| 2,179,339 | Little | Nov. 7, 1939 |
| 2,108,807 | Finzel et al. | Feb. 22, 1938 |
| 2,075,376 | Ubben | Mar. 30, 1937 |
| 1,948,580 | Hucks | Feb. 27, 1934 |
| 2,362,166 | Speicher | Nov. 7, 1944 |